United States Patent
Patel et al.

(10) Patent No.: US 8,572,750 B2
(45) Date of Patent: Oct. 29, 2013

(54) WEB APPLICATION EXPLOIT MITIGATION IN AN INFORMATION TECHNOLOGY ENVIRONMENT

(75) Inventors: Ashish Patel, Ontario (CA); Tamer Aboualy, Ontario (CA)

(73) Assignee: International Business Machines Corporation, Armonk, NY (US)

( * ) Notice: Subject to any disclaimer, the term of this patent is extended or adjusted under 35 U.S.C. 154(b) by 76 days.

(21) Appl. No.: 13/249,937

(22) Filed: Sep. 30, 2011

(65) Prior Publication Data

US 2013/0086688 A1    Apr. 4, 2013

(51) Int. Cl.
    *G06F 21/00*      (2013.01)

(52) U.S. Cl.
    USPC .......................................................... 726/25

(58) Field of Classification Search
    USPC .......................................................... 726/25
    See application file for complete search history.

(56) References Cited

U.S. PATENT DOCUMENTS

| | | | |
|---|---|---|---|
| 6,088,796 A | 7/2000 | Cianfrocca et al. | |
| 6,301,668 B1 | 10/2001 | Gleichauf et al. | |
| 6,584,569 B2 | 6/2003 | Reshef et al. | |
| 6,807,636 B2 | 10/2004 | Hartman et al. | |
| 6,816,973 B1 | 11/2004 | Gleichauf et al. | |
| 7,073,198 B1 | 7/2006 | Flowers et al. | |
| 7,343,599 B2 | 3/2008 | Panjwani | |
| 7,797,752 B1 | 9/2010 | Vaidya et al. | |
| 7,810,159 B2 * | 10/2010 | Bowden et al. ................. | 726/25 |
| 7,845,006 B2 | 11/2010 | Akulavenkatavara et al. | |
| 7,845,007 B1 | 11/2010 | Kennis | |
| 2003/0233581 A1 * | 12/2003 | Reshef et al. ................. | 713/201 |
| 2010/0017868 A1 * | 1/2010 | Hao et al. ......................... | 726/11 |
| 2010/0257603 A1 * | 10/2010 | Chander et al. .................. | 726/22 |
| 2010/0325685 A1 * | 12/2010 | Sanbower ......................... | 726/1 |
| 2011/0197180 A1 * | 8/2011 | Huang et al. .................. | 717/126 |
| 2012/0131678 A1 * | 5/2012 | Horovitz et al. ................ | 726/25 |
| 2013/0019314 A1 * | 1/2013 | Ji et al. ............................ | 726/25 |

OTHER PUBLICATIONS

Perkins et al., "Automatically Patching Errors in Deployed Software", Oct. 2009, ACM, pp. 87-102.*
"Web Application Security with IBM Security Solutions", ftp://public.dhe.ibm.com/common/ssi/ecm/en/ses03002usen/SES03002USEN.PDF.

* cited by examiner

*Primary Examiner* — Matthew Smithers
(74) *Attorney, Agent, or Firm* — Ronald A. Kaschak; Matthew M. Hulihan, Esq.; Heslin Rothenberg Farley & Mesiti P.C.

(57) ABSTRACT

Methods, systems, and computer program products are provided herein for facilitating security in an information technology environment. Web application security vulnerabilities are discovered and addressed by means of virtual patches deployed to components of the information technology environment. An intelligent feedback loop is created to fill the void in the security of the web application when implemented in the specific information technology environment, thereby providing end-to-end security application management through dynamic, pre-emptive, and proactive security awareness and protection in the information technology environment. As new web application security vulnerabilities are discovered, the vulnerability is diagnosed and resolved to preemptively prevent exploitation of the security vulnerability.

25 Claims, 7 Drawing Sheets

WEB APPLICATION EXPLOIT MITIGATION IN AN INFORMATION TECHNOLOGY ENVIRONMENT

BACKGROUND

A web application is a software application coded in a browser-supported language (such as HTML, JavaScript, Java, and/or other languages). The web application is rendered executable by a web browser which accesses the web application over a network, such as the Internet, or an intranet, via an internet transfer protocol.

The web application is hosted by one or more computer systems of an information technology environment. To ensure security of the hosted web application, the information technology environment typically includes a security infrastructure that surrounds the hosted web application infrastructure. Both hardware (such as hardware security appliances) and software (such as a network firewall, antivirus software, and/or host-based intrusion prevention/detection systems) components are typically provided to facilitate protection of the information technology environment and its components. However, existing security components of an information technology environment are often unable to adequately block or prevent exploitation of specific vulnerabilities that exist with the web application of the environment.

BRIEF SUMMARY

One or more aspects of the present invention improve protection against exploitation of security vulnerabilities of a web application. Present approaches to intrusion protection are inadequate because existing components are unaware of threats that are specific to the execution of the web application in the particular information technology environment in which the web application is hosted. By combining knowledge of web application security vulnerabilities, intrusion protection systems, and other security infrastructure, it is possible to create a feedback loop useful for addressing security vulnerabilities and preventing exploitation thereof.

The shortcomings of the prior art are overcome and additional advantages are provided through the provision of a method for facilitating security in an information technology environment. The method includes, for instance, inspecting behavior of a web application during execution thereof in the information technology environment to determine whether a security vulnerability associated with execution of the web application in the information technology environment exists. The method further includes, for instance, responsive to determining that the security vulnerability exists, generating at least one virtual patch, the at least one virtual patch comprising one or more logical pattern expressions representative of the security vulnerability determined based on the behavior of the web application during execution thereof, and the at least one virtual patch for patching one or more infrastructure components of the information technology environment to prevent exploitation of the security vulnerability in the information technology environment.

Systems and computer program products relating to one or more aspects of the present invention are also described and claimed herein.

Further, services relating to one or more aspects of the present invention are also described and claimed herein. For instance, a method is provided for facilitating on demand security in an information technology environment of a customer. The method includes, for instance, responsive to a customer request, inspecting behavior of a web application during execution thereof in the information technology environment of the customer to determine whether a security vulnerability associated with execution of the web application in the information technology environment of the customer exists. The method further includes, for instance, responsive to determining that the security vulnerability exists, generating at least one virtual patch, the at least one virtual patch comprising one or more logical pattern expressions representative of the security vulnerability determined based on the behavior of the web application during execution thereof, and the at least one virtual patch for providing to the customer for patching one or more infrastructure components of the information technology environment of the customer to prevent exploitation of the security vulnerability in the information technology environment of the customer.

Additional features and advantages are realized through the concepts of the present invention. Other embodiments and aspects of the invention are described in detail herein and are considered a part of the claimed invention.

BRIEF DESCRIPTION OF THE SEVERAL VIEWS OF THE DRAWINGS

One or more aspects of the present invention are particularly pointed out and distinctly claimed as examples in the claims at the conclusion of the specification. The foregoing and other objects, features, and advantages of the invention are apparent from the following detailed description taken in conjunction with the accompanying drawings in which:

DETAILED DESCRIPTION

Aspects of the present invention detect web application security vulnerabilities and enhance intrusion protection of a computer system to guard against exploits. A security vulnerability describes a weakness in a system through which an automated or user-driven process or sequence of events can violate the integrity of that system. In software systems, a security vulnerability may result from weak passwords, software bugs, a computer virus or other malware, a script, or structured query language (SQL) injection, as examples. A security vulnerability has associated with it some level of security risk, which refers to the potential for the vulnerability to be taken advantage of (exploited) and the amount of loss that might potentially be incurred. Security vulnerabilities are exploited by means of an exploit. An exploit can include, but is not limited to, a piece of software, a chunk of data, or sequence of commands that take advantage of the security vulnerability in order to cause unintended and/or unanticipated behavior to occur on the computer system. Exploits can, for example, enable a process or entity, such as an unauthorized user, to gain control of a computer system, allow privilege escalation, or effect a denial of service attempt.

There exists a void in the security of web applications when implemented in an information technology environment. The problem arises because of the uniqueness of the web application and the difficulty in detecting application level security issues once the web application is in production (i.e. "live"). Custom web applications are different from common 'shrink wrap' software which receive regular security updates. The intricacies and complexities of an organization's customized web application, such as those used in financial institution online banking, brokerage, or insurance businesses, make it difficult to continually discover and patch security issues. In addition, many custom web applications are built to integrate a variety of systems and/or 'shrink wrap' software, where the integration itself becomes vulnerable to security threats. An examination of the application code of the web application is inadequate, since applications can become susceptible to exploits depending on the particular environment in which the web application is implemented.

A linkage between custom web applications and security appliances does not exist to address the above problems. Firewalls, intrusion prevention systems, intrusion detection systems, and antivirus software are not aware of the security threats potentially exposed by customized web applications when in production, nor are they aware when changes are made to those web applications that could introduce new threats.

Intelligent components are provided herein to continually discover web application security vulnerabilities, understand how to resolve them in the information technology environment, and safely deploy countermeasures to the security infrastructure and appliances of the information technology environment. With an intelligent component, a feedback loop is created to fill the void between web application infrastructure and security infrastructure, providing end-to-end security application management. This helps to provide dynamic, pre-emptive, and proactive security awareness and protection in the information technology environment. As new web application security vulnerabilities are discovered, the intelligent component(s) can diagnose the vulnerability and (in many cases) resolve it absent human intervention, thereby preemptively thwarting exploitation of the security vulnerability.

Figure 1:
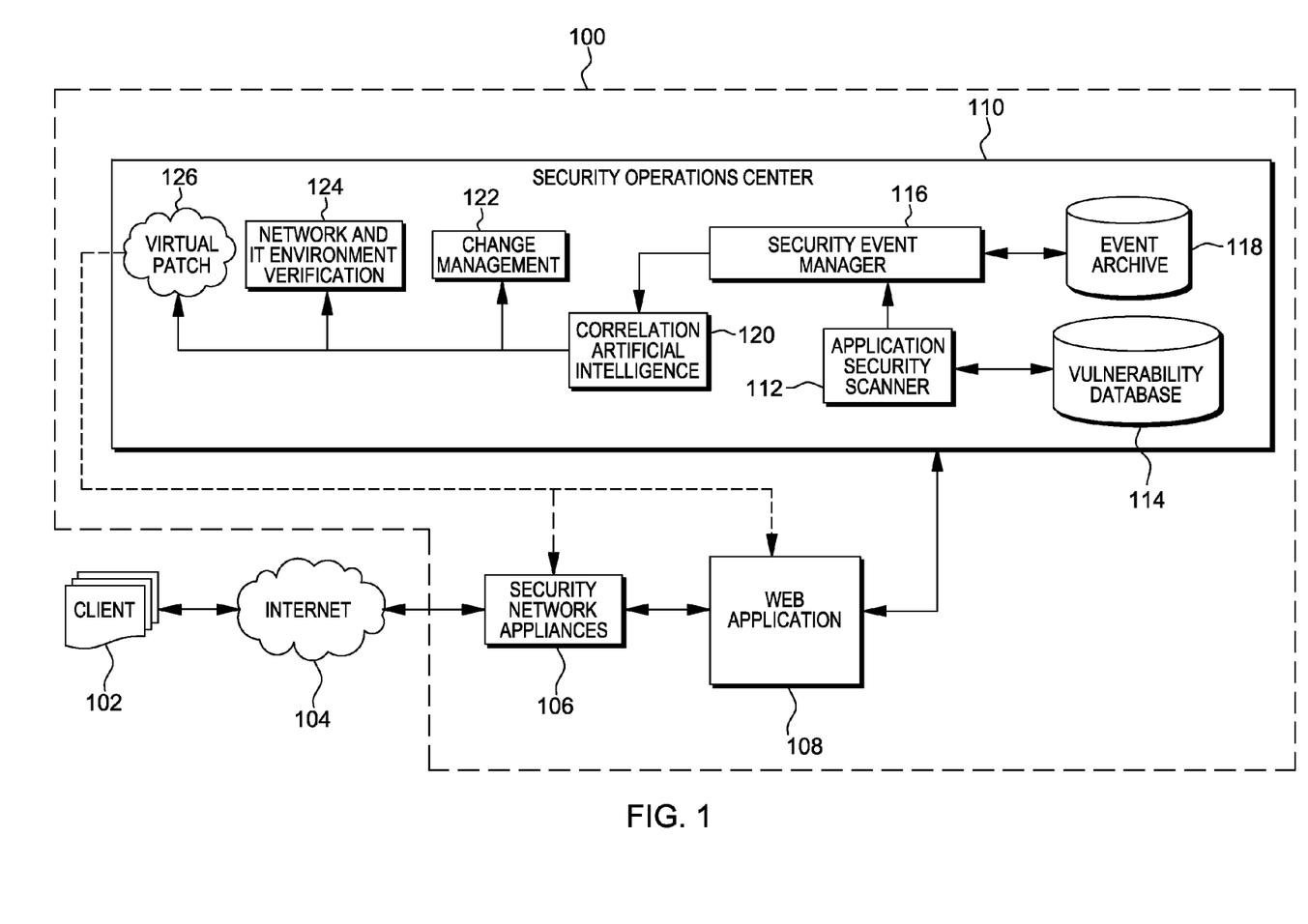
FIG. 1 depicts an example of an information technology environment to incorporate one or more aspects of the present invention.

FIG. 1 depicts one example of an information technology environment to incorporate one or more aspects of the present invention. An information technology environment may include some or all information technology components of an organization. In FIG. 1, one or more clients 102 access an information technology environment 100 via a network, such as the internet 104. In particular, client machines 102 access a web application 108 of information technology environment 100 via one or more security/network appliances 106. A security appliance is a component (hardware or software) that offers security protection for a computer network. There are numerous types of security appliances which are readily recognizable by those having ordinary skill in the art. Security appliances protect against unwanted data traffic, intruders, and e-mail spam, enforce policies, and/or create and manage access network access such as virtual private network (VPN) access, as examples. A common type of security appliance is a network firewall which can be an independent computer system running a specialized operating system for performing firewall functions.

Continuing with FIG. 1, information technology environment 100 includes a security operations center 110. Security operations center 110 is responsible for coordinating security efforts in information technology environment 100. In one example, security operations center 110 is implemented in one or more computer systems comprising one or more processors and one or more memories. Web application 108 communicates with security operations center 110, for instance with an application security scanner 112 of security operations center 110. Application security scanner 112 comprises computer hardware and/or software capable of identifying vulnerabilities and security risks of a software application executing on one or more processors, such as web application 108. (Examples of application security scanners include the Rational® AppScan® product line offered by International Business Machines, Armonk, N.Y.). As described in further detail below, vulnerability identification is facilitated by way of a security scan inspection process performed by application security scanner 112. Application security scanner 112 stores vulnerability data in a vulnerability database 114 to maintain a record of known vulnerabilities associated with information technology environment 100, including vulnerabilities identified by application security scanner 112 during a security scan inspection process.

Application security scanner 112 communicates with a security event manager 116. Security event manager 116 centralizes the storage and interpretation of logs ("events"), generated by other software running on the network, such as software executing on components (security/network appliances, web application, etc.) of information technology environment 100. In this example, security event manager 116 stores event data in event archive 118 for retrieval and interpretation.

As network events are detected and centralized by security event manager 116, analysis is performed by a correlation artificial intelligence component 120, which receives event information from security event manager 116. An artificial intelligence component in general provides intelligence to adapt the workflow of a process by learning the behavioral patterns of an end-to-end computer system to generate a favorable output. Artificial intelligence component 120 communicates with a change management component 122, network and information technology environment verification component 124, and virtual patch component 126, which is responsible for deploying one or more virtual patches to the security/network appliances 106 and/or web application 108 as necessary, responsive to a virtual patch process (described with reference to FIG. 6). An objective of change management component 122 is to ensure that standardized methods and procedures are used for efficient and prompt handling of changes, e.g. the virtual patches, to the components of information technology environment 100. It provides standardized methods, processes and procedures for changes to be made, facilitates efficient and prompt handling of these changes, and helps maintain a balance between the desire for a component change or modification and the potential detrimental impact of such a change. One example of a change management component is a Tivoli® Change and Configuration Management Database (CCMDB) offered by International Business Machines, Armonk, N.Y.), and can serve as a basis for the automation of information technology infrastructure library (ITIL) processes, such as configuration and change management, as well as incident management and problem management. Additionally, change management component 122 can also be a point of control to verify whether or not the change is to be allowed. Network and information technology environment verification component 124 communicates with change management component 122 to fetch the current configuration of the information technology environment (including configuration of the components thereof) and validate the change being suggested in a virtual patch (described in further detail below), and also communicates current and/or previous information technology environment configurations for their applicability to the virtual patch. Further details of artificial intelligence component 120, change management component 122, and network and information technology environment verification component 124 are described in further detail below.

Figure 2:
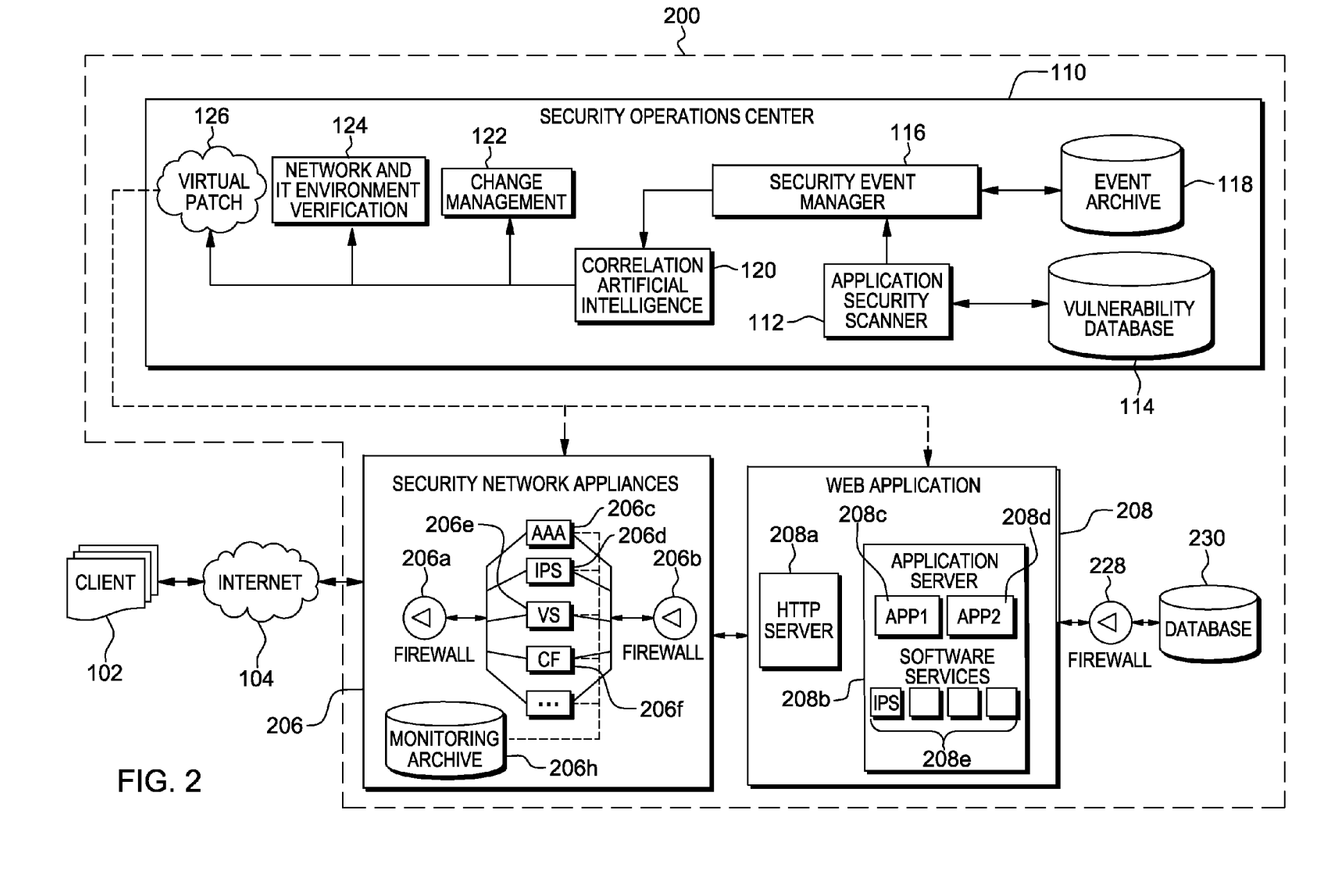
FIG. 2 depicts a further example of an information technology environment to incorporate one or more aspects of the present invention.

FIG. 2 depicts a further example of an information technology environment to incorporate one or more aspects of the present invention. FIG. 2 comprises similar components to those shown in FIG. 1 (using similar reference numerals to denote similar components), but provides further examples with respect to the security/network appliances and the web application.

In FIG. 2, security/network appliances 206 include firewalls 206a and 206b which monitor transmissions to and from other security/network components. One such component is Authentication, Authorization and Accounting component 206c. Authentication refers to a process where an entity's identity can be indicated from an identifier and credentials (e.g. username and password), while authorization determines whether a particular identity is allowed to perform a particular activity, and accounting is the tracking of users and which systems they access and consume. Other security/network components include intrusion prevention system 206d (to monitor the network and/or system activities for malicious activity, log information about said activity, attempt to block/stop activity, and report activity); vulnerability scanner component 206e (computer hardware/software to assess computers, computer systems, networks or applications for weaknesses; different types of vulnerability scanners can focus on particular targets, such as application, hardware, network, databases, middleware etc.); and content filter component 206f (responsible for blocking or allowing content based on analysis of the content itself, rather than the source or other criteria of the content (i.e. filtering spam from email because of the email's content)). In the example of FIG. 2, security/network appliances 206 further include a monitoring archive 206h for logging monitored activity of information technology environment 200 by one or more of the security/network appliances 206. The monitoring archive may alternatively be provided as part of the security operations center of the information technology environment (specifically network and information technology environment verification component 124). As described below, the log information can be used by correlation artificial intelligence component 120 to determine whether data leakage has occurred in the past through a discovered exploit. If data leakage has occurred, a forensic investigation can be initiated.

As depicted in FIG. 2, web application 208 includes HTTP server 208a for sending and receiving HTTP traffic to and from clients 102. HTTP server 208a communicates with a web application server 208b that hosts two (in this example) web applications 208c, 208d, and that further provides other software services 208e. Software services 208e include "plug-ins" and/or "extensions" to application server middleware software. Such plug-ins or extensions expand the function of the basic application server and facilitate running customized services in parallel with the server's execution path. One example of an extension is a software-based intrusion prevention system (IPS) which performs a similar function as a dedicated hardware intrusion prevention system (e.g. 206d), but would operate within the context/scope of the application running in the application server middleware. These extensions can also access context data and information about the application as it executes, such as a uniform resource identifier (URI) or internet protocol (IP) accessed by an end-user or client. Each middleware has its own extension framework with their own specific application programming interfaces that these computer services would execute against.

Web application 208 accesses a database 230 protected by firewall 228. It is common for a web application to access backend database content, such as content in a structured query language (SQL) database. For security reasons, backend databases (and other components if present) are protected by a separate firewall (e.g. 228) between web application components 208 and other backend components in order to add an additional layer of security protection, in case a security compromise is able to exploit web application components 208.

Figure 3:
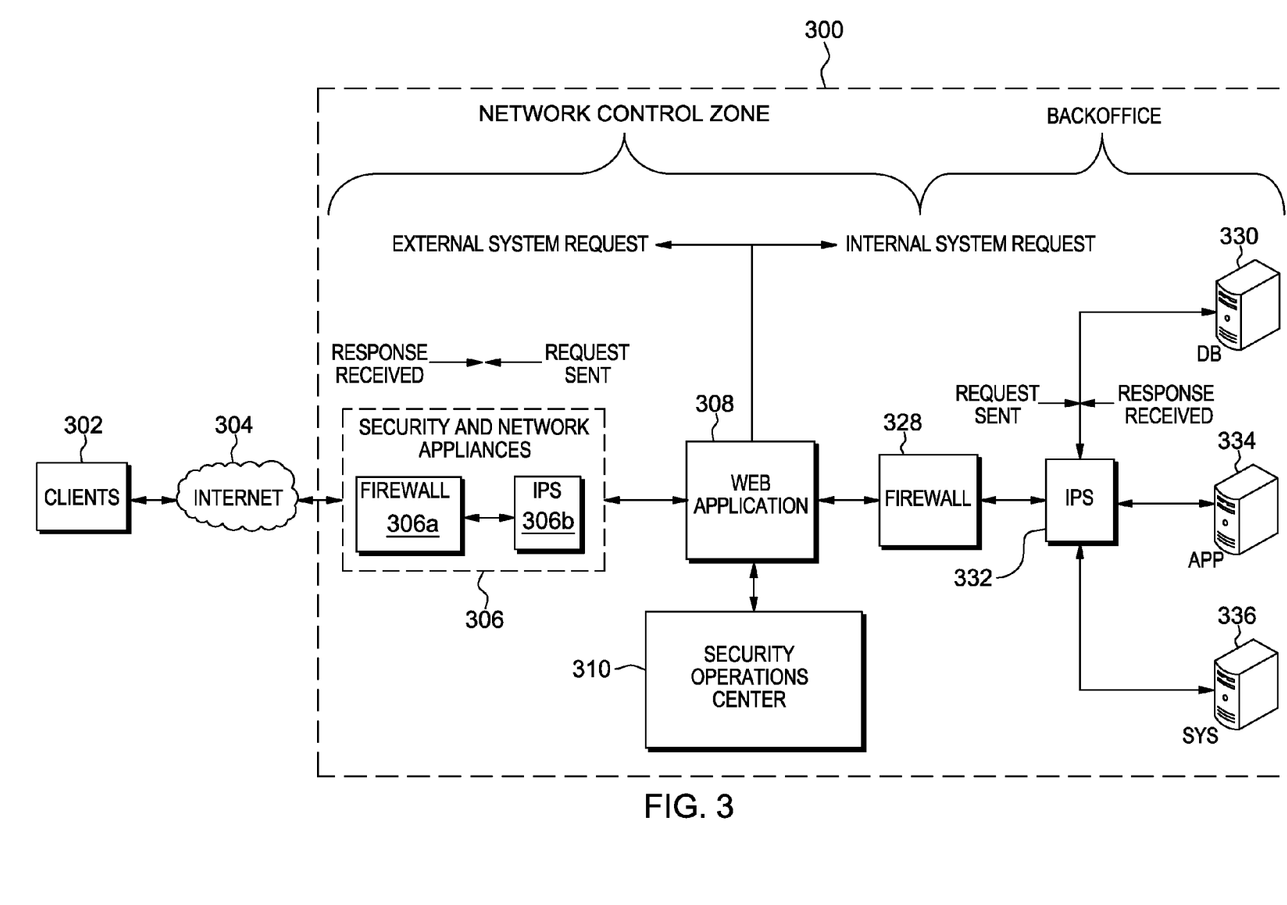
FIG. 3 depicts another example of an information technology environment to incorporate one or more aspects of the present invention.

FIG. 3 depicts another example of an information technology environment to incorporate one or more aspects of the present invention. In FIG. 3, one or more clients 302 access web application 308 of information technology environment 300 via the internet 304 and security/network appliances 306, which, in this example, include firewall 306a and intrusion prevention system 306b. Web application 308 also communicates with security operations center 310, similar to the configuration above in FIGS. 1 & 2. Security/network appliances 306, web application 308, and security operations center 310 form a network control zone of information technology environment 300. The network control zone exposes the organization's external services (e.g. web application 308 for instance) to a larger untrusted network, in this case the internet 304.

Sitting behind the network control zone in FIG. 3 are backoffice components including database component 330, app component 334 and sys component 336 that are accessed by web application 308 through firewall 328 and an additional intrusion prevention system 332 designed to protect backoffice components 330, 334, and 336. Database component 330 includes computer hardware/software that provides a service to organize, collect, and manage vast quantities of data (or information) in digital form. App component 334 includes computer hardware/software that provides a software framework as a service, allowing applications to run on top of it to exploit the computing resources below the framework. The framework can manage these applications within known conditions and boundaries to help deliver quality, performance, security, and reliability to the application, where possible. Sys component 336 is a more generic version of other backoffice components such as database component 330 or app component 334. Sys component 336 includes computer hardware/software providing services providing access to compute, storage, network, and other peripherals of a computer system to serve the requests of a computer program, such as a client.

Web application 308 accesses backoffice components as part of a system request. Web application 308 makes various types of requests responsive to client requests during execution of the web application. For instance, when a client 302 initiates a web application session, web application 308 might initiate an authentication routine in which a system request is issued by web application 308 to one or more backoffice components 330, 334, 336 to verify user-supplied credentials. System requests issued to backoffice components are known as internal system requests. Other system requests issued by web application 308 include external system requests. External system requests are those issued from web application 308 through the network control zone away from information technology environment 300 of the organization. For instance, web application 308 may call an application programming interface (API) of some external service provider (not pictured), which API call is issued to the external provider as an external system request.

The above are non-limiting examples of information technology environments to incorporate one or more aspects of the present invention. Those having ordinary skill in the art will readily recognize that there are others.

Figure 4:
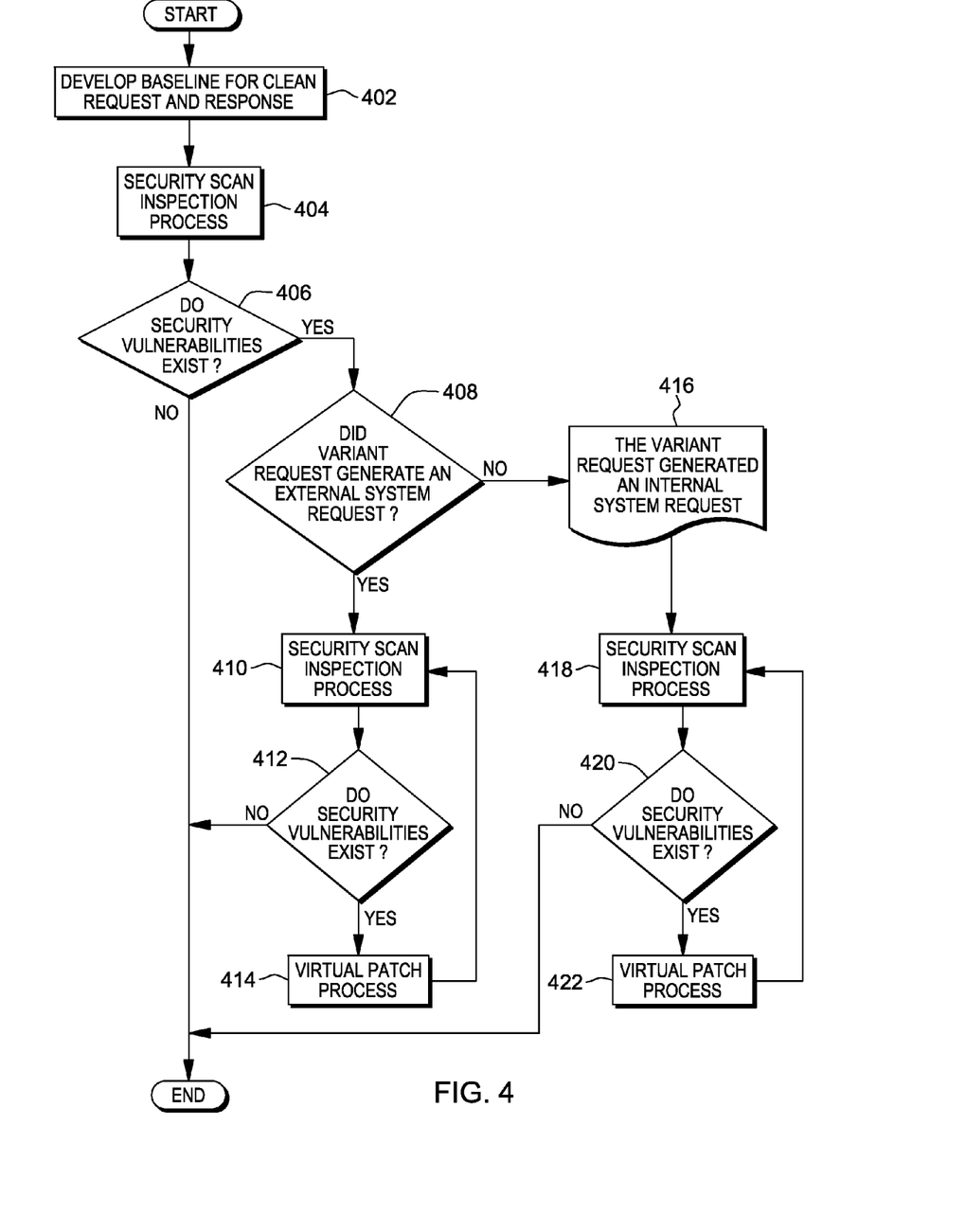
FIG. 4 depicts one example of a process for facilitating security in an information technology environment, in accordance with one or more aspects of the present invention.

In accordance with one or more aspects of the present invention, detection of web application security vulnerabilities is provided to enhance intrusion protection of a computer system and guard against exploits. The overall process, as depicted in FIG. 4 and described in conjunction therewith, can be repeated continuously to ensure up-to-date and real-time protection of the information technology environment.

The process begins by establishing a baseline behavior for the web application (402). This includes issuing one or more test scenarios to the web application for execution and capturing responses of the application responsive to the web application's execution of the test scenarios. Each test scenario is called a baseline request and each baseline request includes one or more request elements. A request element is one or more items included in a request message by which a request is issued. Request elements include target, parameters of the request, host, method, etc. Each baseline request is then paired with a baseline response which is the web application's response to executing the baseline request. This pairing forms a baseline request/response pair.

Multiple baseline request/response pairs are collected which form the baseline behavior of the web application. This baseline behavior represents the web application's use in testing, protocol, page, and response time, and establishes other expectations about the behavior of the web application in production within the information technology environment.

After establishing the baseline behavior of the web application, a security scan inspection process executes (404), described with reference to FIG. 5. During this process, the baseline requests, representing routine 'clean' requests issued to the web application, are modified in order to simulate a 'hack' of the routine clean requests, in an effort to find security vulnerabilities of the web application. The hacking attempts to alter the baseline requests into requests that might be issued as part of an attempted security compromise. Vulnerabilities can then be discovered based on the responses received from executing the hacked requests.

The security scan inspection process is, in one example, executed by the application security scanner (e.g. #112 of FIG. 1). Referring to FIG. 5, the security scan inspection process begins by determining one or more variant requests (502). Variant requests are computed based on the baseline requests that were executed during the baseline behavior determination described above. The computed variant requests are modified versions of the baseline requests. Each variant request is a modification of an associated baseline request, and more specifically, the variant request includes modification(s) to one or more request elements of the associated baseline request, to form the variant request. It is through these modifications to the request elements and examination of how the web application responds to those modifications that security vulnerabilities are discovered.

Figure 5:
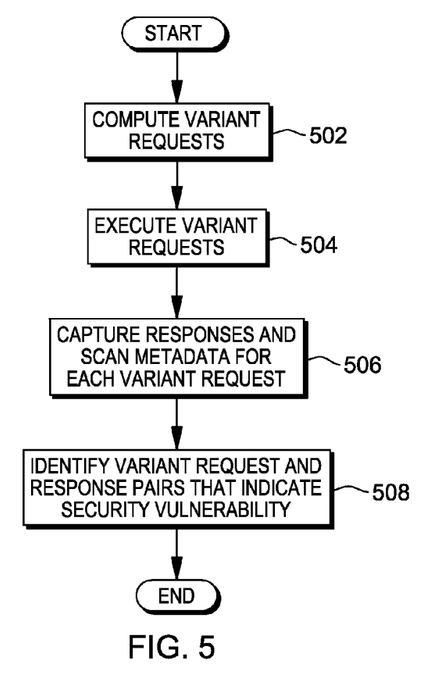
FIG. 5 depicts one example of a process for inspecting behavior of a web application during execution thereof in an information technology environment, in accordance with one or more aspects of the present invention.

Continuing with the description of the security scan inspection process of FIG. 5, each variant request is issued and executed (504). The web application's response is captured as a variant response, and the variant response is stored (506), along with security scan metadata, which comprises the modifications made to the associated baseline requests to form the variant request. The captured variant response is then compared against the baseline response of the associated baseline request that was used to form the variant response. The differences between the baseline responses and the variant responses are examined and can indicate whether the issued variant request included a modification that resulted in an exploit of a security vulnerability, as evidenced by the generated variant response. Thus, based on this comparison, variant request/response pairs can be identified that indicate a security vulnerability (508). In one embodiment, when a security vulnerability is discovered, the application security scanner can send a message to the security event manager of the security operations center to log the security vulnerability. The security event manager can log a ticket in a change management system (e.g., FIG. 1 #122) to inform an administrator of the security issue, which ticket can remain open until the security vulnerability is corrected and the application security scanner discovers (e.g. through a rescan) that the security vulnerability is no longer present (412 of FIG. 4, described below). Alternatively, the security vulnerability could be manually classified as a false-positive if required. One purpose of managing and tracking vulnerabilities and related remediation through a ticketing system is to provide a method of tracking and to provide a representation of what is presently occurring in the environment, or what has just occurred. Allowing a manual method to classify certain vulnerabilities as a false-positive provides a means for error handling. It can override a system's classification if incorrect or unneeded actions are about to take place as a result of the incorrect classification. This also allows for flexibility to account for anomalies and unique conditions of various environments.

The security event manager can additionally correlate an identified security vulnerability to other logged events received from other security infrastructure components of the information technology environment, such as firewalls, intrusion prevention systems, intrusion detection systems, antivirus definitions, network Authentication, Authorization, and Accounting servers, and other security/network appliances and software.

This completes the security scan inspection process of FIG. 5 to determine whether a security vulnerability exists. Returning the FIG. 4, the process determines whether a security vulnerability exists (406) based on the security scan inspection process that just completed. If no security vulnerability is found to exist, the process ends. If a security vulnerability exists, a determination will be made (408) whether the vulnerability originated from outside the environment (External System Request) or if, instead, the vulnerability was generated inside the environment (Internal System Request). This is important on account that a compromise attempt may try to exploit a vulnerability that can only be compromised internally. That is, the vulnerability may be viewable only from the internal network and not the external internet. Both internal and external views are therefore critical, as a "defense in depth" strategy requires that multiple layers of security are employed, in the event that the first line of defense was compromised. Note that as described in Example 1 (below), an advanced persistent threat is an example of a targeted attempt to exploit such internal vulnerabilities or processes.

If the variant request that exploited the vulnerability generated an external system request by the web application (408), then a loop commences beginning with performance of a second security scan inspection (410). This second security scan is tailored to issue variant requests that will cause external system requests; that is, this second security scan will focus on requests and responses in the context of where the vulnerability originated, in this case externally. After this second security scan inspection process (410) completes, it is determined whether security vulnerability exists (412) and, if so, a virtual patch process (414) will be performed (described in detail below). This loop, comprising a security scan (410) followed by a determination of whether a security vulnerability still exists (412), followed by the virtual patch process (414), repeats until it is determined that no security vulnerability exists (412), based on the security scan inspection (410) and the process ends.

If it is instead determined that the variant request generated an internal request (416), a similar loop commences, in which security scan inspection process (418) executes but is tailored to issue variant requests that cause internal system requests. This security scan inspection process (418) is followed by a determination whether a security vulnerability exists based on the security scan inspection process (418). If so, virtual patch process (422) is performed, and the loop repeats until no security vulnerabilities exist (420), as above.

As noted, once the security scan inspection process (412, 420) completes, and if security vulnerabilities have been identified, a virtual patch process (414, 422) will execute. In the virtual patch process, a patch is created and deployed, and the scanning process will continually execute (in the loop described above) until the identified security vulnerabilities are no longer exploitable in the environment.

Figure 6:
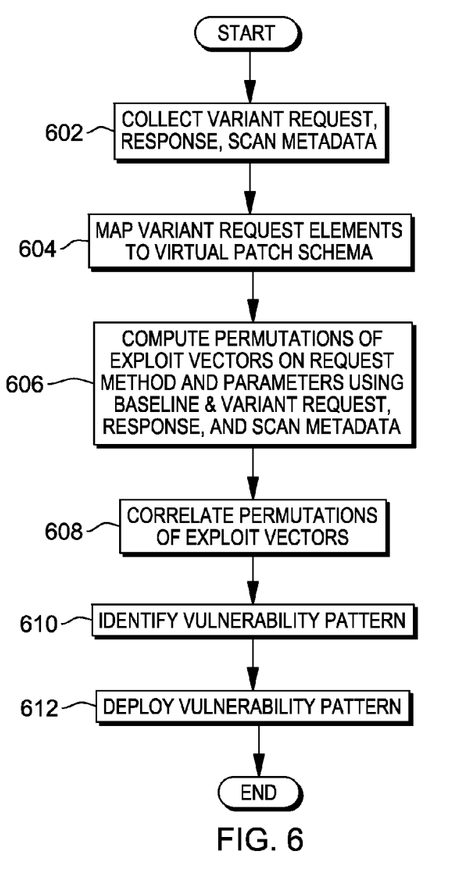
FIG. 6 depicts one example of process for generating one or more virtual patches for patching one or more components of an information technology environment, in accordance with one or more aspects of the present invention.

Development of a proper patch should take into account the logic behind the baseline behavior and the uncovered vulnerabilities thereof. The virtual patch process leverages the variant requests, the associated corrupt variant responses indicating the vulnerability, and security scan metadata to create a virtual patch. Referring to FIG. 6, the process begins by collecting variant requests and their associated responses as variant request/response pairs, along with the security scan metadata (602). Each request element of the variant request is mapped to an overall virtual patch schema (604). The virtual patch schema is a generic schema that is converted to the specific interface for the type of device or equipment it is patching. For example, network devices would be one type of device, and the request elements would be mapped to a virtual patch schema appropriate for patching network devices, and software (middleware, application, etc.) are a different type of device which would be mapped to a different virtual patch schema appropriate for patching those types of devices. The mapping to a virtual device schema identifies the request elements of web application requests that, through their variance, may attempt to exploit a common security vulnerability using different permutations of a request. For example, 2+2=4, while at the same time 1+1+1+1=4. Although requests elements vary (e.g. 2+2; 1+1+1+1), the resulting vulnerability (their sum, 4) is common. These variable elements are used to compute permutations of exploit vectors (606) of the variant request(s). An exploit vector is the request method used for exploiting the vulnerability, and permutations of the exploit vectors include permutations of the request method and the request elements of the variant request.

As a specific example, consider the output from a security scan inspection which shows the following:

Baseline request BR generates baseline response BS. Baseline request BR contains request elements, such as request parameters, that are modified to generate several variant requests (VR1, VR2, . . . , VRn)

Variant request VR1 generates variant response VS1, with the difference between VS1 and BS indicating a security vulnerability associated with that variant request Variant request VR2 generates variant response VS2, with the difference between VS2 and BS indicating no security vulnerability associated with that variant request Variant request VRn generates variant response VSn, with the difference between VSn and BS indicating a security vulnerability associated with that variant request Using the scan metadata for VR1 and VRn (and other variant requests that exploited the common vulnerability), permutations of these exploit vectors (since they exploited the security vulnerability) are correlated and abstracted into logical pattern expressions (608) to identify a vulnerability pattern (610). Throughout this process, different permutations of the exploit vectors that successfully exploited the security vulnerability are extrapolated. For instance, permutations of VR1 are extrapolated, and permutations of VRn (and any other variant requests that exploited the vulnerability) are extrapolated. using the above example, if the exploit vector of VR1 was 2+2, permutations of this exploit vector of VR1 include (but are not limited to) {1+1+1+1, 1+3, 1+1+2}. As an example of a vulnerability pattern, the correlation between all of the permutations may identify a vulnerability pattern in which any string with more than 10 characters results in a compromise. Once these logical pattern expressions ("signatures") are identified, they can be deployed (612) to, for instance, one or more components of the information technology environment as part of a virtual patch to prevent exploitation of the security vulnerability in the information technology environment. In one example, the virtual patch can be deployed as an algorithm to an intrusion prevention system to enable the intrusion prevention system to identify particular exploit requests and block the exploit pattern destined for the target web application, before this exploit request reaches the web application to exploit the vulnerability thereof.

In one example, the virtual patch process is performed by a correlation artificial intelligence component (e.g. #120 of FIG. 1) of a security event manager. The artificial intelligence component can additionally examine the security infrastructure of the information technology environment to determine whether the existing security infrastructure is already blocking or alleviating the security vulnerability. For instance, it can check whether a similar patch has already previously been deployed. If the security vulnerability is not already being blocked or alleviated, the artificial intelligence component can initiate countermeasures by creating a virtual patch that is sent to one or more components of the security infrastructure, such as an intrusion prevention system. The intrusion prevention system could receive a patch, such as a rule or signature, from the security event manager, that would block the vulnerability. Optionally the security event manager could also send a patch to firewalls, authentication authorization and accounting servers, and/or other security devices to block specific IP address ranges, ports, or other particular types of requests. To confirm that the virtual patch has been applied, the security event manager can send a confirm message to the application security scanner to initiate a rescan of the application.

The artificial intelligence component could also check a network and information technology environment verification component (e.g. #124 of FIG. 1), or other type of log of historical network events to see if data leakage has occurred in the past due to the (now) discovered vulnerability. Data leakage occurs when a vulnerability exists in a computer system that allows an exploiter to gain access to a computer system's data. For example, when an SQL injection vulnerability exists, an exploiter can gain access to data stored in an SQL database. If it is determined that data leakage did occur, a forensic investigation could be initiated in order to, for instance, assess the source, time, and extent of the breach. Furthermore, an evaluation can be performed to assess the adequacy of current security appliance and other infrastructure component configurations in satisfying governmental compliancy regulations (such as Payment Card Industry Data Security Standard (PCI-DSS), Sarbanes-Oxley, Health Insurance Portability and Accountability Act (HIPPA), etc . . . ), and to determine whether an exploit such as data leakage has already led to an unsuspected compliancy breach.

Three specific examples are provided below to illustrate the operation of the processes for facilitating security in an information technology environment, for inspecting behavior of a web application during execution, and for generating one or more virtual patches for patching one or more components of an information technology environment. The below examples are described specifically with regard to the infrastructure depicted in FIG. 3, though are by no means limited to such an infrastructure.

Example 1

Internal Threats

Many security breaches occur internally and are also known as internal threats. Advanced forms of these threats are known as Advanced Persistent Threats (APTs), which are targeted exploit attempts that typically attempt to exploit internal vulnerabilities or failures in internal security or policy, with the result of compromising a target. An APT will monitor its target for weaknesses and exploit the target's weaknesses to it's advantage. For example, a daemon or agent executing on a server that is used for testing could be infected, via the Internet, and this could be used to gain access into the rest of information technology environment.

In this example, an APT exists on an internal application server which is connected to the internet. The vulnerability is only exploitable from within the network, meaning the internal application server portion of the web application is not accessible from the external application, but only from the internal network. In the context of the above example, the APT is a hidden threat in the web application. As a result, a conventional web application security scanner, which is program set up to communicate with the web application through the web front-end in order to identify potential security vulnerabilities in the web application, would be unable to discover and pinpoint the source of this type of vulnerability. The exploit is nonetheless very serious, however, since it provides a back door entrance to be able to control the server from the internet. A compromise is attempted by inserting executable code within an HTTP stream (or other acceptable method) which would enable control of the server. The success of the attempted compromise could then be determined based on the response to the message and/or invoking the code that was executed on the host.

To discover this type of threat, the application security scanner (e.g. #112 of FIG. 1) of the present invention would scan internally (e.g. #416, 418 of FIG. 4) and discover the threat. Once it is determined to exist, a virtual patch would be deployed. The virtual patch would block the internal response from the backoffice component(s) 330, 334, 336 by blocking the response at the intrusion prevention system (#332 of FIG. 3). In this example, the vulnerability was only present when executing an internal request from the web application to the backoffice, and therefore blocking the response at intrusion prevention system 332 alone would suffice. However, the external intrusion prevention system (e.g. 306b) can also be patched to block the response, thereby providing redundancy (in the event a security component change occurred, for instance) and in case an advanced compromise would make the vulnerability viewable externally.

Example 2

SQL Injection

A SQL injection based security compromise is one that exploits the database functionality of a web application. In this type of exploit, an attempt is made to create an HTTP stream containing commands that execute database queries. The results from these queries are contained in an HTTP response, potentially extracting sensitive information and compromising the web application, information technology environment, and organization. SQL injection based attempted security compromise are successful when a flaw in the web application is present such that compromising or illegitimate commands are not filtered out.

To alleviate this, in accordance with one or more aspects of the present invention, after the application security scanner develops the baseline behavior, various illegal SQL commands and modifications thereof will be issued (called exploit vectors) and the responses observed. The various vectors causing exploits of security vulnerabilities (called Vulnerability Structured Query Language (VSQL) types) are then determined.

To discover this type of threat, the scanner can scan both externally and internally in three ways:
  Externally: Determines whether the HTTP stream is communicating fragments of SQL query text
  Internally: Determines whether the SQL result text in the HTTP response stream is released outside the information technology environment
  Externally originating, but modifies internal application to exploit database: Determines whether the programmed SQL query text in the application was modified during execution by a malicious HTTP request stream The virtual patch to block exploitation of the determined SQL injection vulnerabilities is then applied at the applicable components of the information technology environment. For instance, this would include patching the internet-facing intrusion prevention system and, if the database is in a different network segment (e.g. backoffice or elsewhere such as in an external network segment), it would also be applied to the intrusion prevention system that protects the database from which the SQL response data originates. As a result, in the event that the application server was compromised, the intrusion prevention system(s) would prevent the server that is compromised from attempting to exploit the sensitive data in the database.

Example 3

Cross-Site Scripting

Cross-site scripting, known as "XSS", allows injection of malicious scripts into a web application. These scripts may bypass client side security or access page and session content, exploiting the user and their device. Most commonly, XSS is executed using fragments of Javascript or other dynamic scripting language that alter a client browser's execution flow.

An attempt to compromise the target is made by inserting executable script code within an input field or HTTP parameter of a web application. Once the request is made, and if the web application has not properly sanitized the input field or HTTP parameter(s), this code will be sent as part of the HTTP response from the web application to the client. Once received by the browser at the client, this injected script is executed to cause an exploit. One specific example of this is when a user inserts script code into the search field of a search website, submits the search, and the search results display the user's input search criteria script code (included in the response from the web application), for instance as an alert pop-up when the search results page is loaded.

To discover this type of threat, the application security scanner (e.g., #112 of FIG. 1) scans the response to be received by the user (e.g. the client), or the response from an external service received by the web application. In the later scenario, the response from the external service is to be used as input to the rest of the web application's execution flow to create the end-to-end response for the overall request originating from the client. Like above, once the security vulnerability has been identified, a virtual patch is deployed to the appropriate components (e.g. the intrusion protection system (s)) in order to block responses that include malicious executable script code in the body of the (e.g. HTTP) responses, in order to block exploitation of the vulnerability.

More specifically, a variant request can include a protocol portion, IP address and port information portion, and an exploit vector portion. The exploit vector can comprise of a script, written in a dynamic scripting language (such as JavaScript), to issue an alert upon loading the results page of the search request. The variant response would be the embedding of the scripted alert in the results page, causing an alert at the client when the client loads the results page. Using this example, a virtual patch can include a protocol portion (corresponding to the protocol portion of the variant request), an IP address and port information portion (also corresponding to the variant request), and an exploit vectors portion for identifying exploit vectors (including the scripted alert portion of the variant request). Upon issuing the virtual patch to the various appropriate components capable of blocking an exploit of this type, the components will identify these types of exploit vectors of the identified protocol, IP address and port information.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 7:
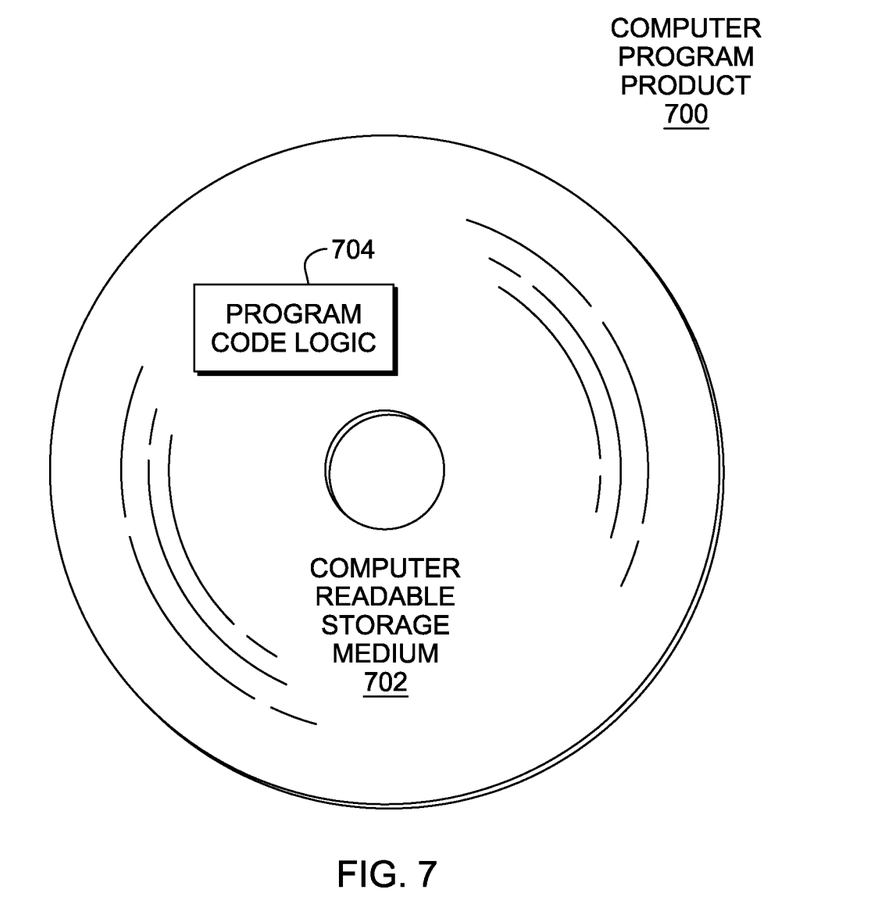
FIG. 7 depicts one embodiment of a computer program product to incorporate one or more aspects of the present invention.

Referring now to FIG. 7, in one example, a computer program product 700 includes, for instance, one or more non-transitory computer readable storage media 702 to store computer readable program code means or logic 704 thereon to provide and facilitate one or more aspects of the present invention.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

In addition to the above, one or more aspects of the present invention may be provided, offered, deployed, managed, serviced, etc. by a service provider who offers management of customer environments. For instance, the service provider can create, maintain, support, etc. computer code and/or a computer infrastructure that performs one or more aspects of the present invention for one or more customers. In return, the service provider may receive payment from the customer under a subscription and/or fee agreement, as examples. Additionally or alternatively, the service provider may receive payment from the sale of advertising content to one or more third parties.

In one aspect of the present invention, an application may be deployed for performing one or more aspects of the present invention. As one example, the deploying of an application comprises providing computer infrastructure operable to perform one or more aspects of the present invention.

As a further aspect of the present invention, a computing infrastructure may be deployed comprising integrating computer readable code into a computing system, in which the code in combination with the computing system is capable of performing one or more aspects of the present invention.

As yet a further aspect of the present invention, a process for integrating computing infrastructure comprising integrating computer readable code into a computer system may be provided. The computer system comprises a computer readable medium, in which the computer medium comprises one or more aspects of the present invention. The code in combination with the computer system is capable of performing one or more aspects of the present invention.

Although various embodiments are described above, these are only examples. For example, computing environments of other architectures can incorporate and use one or more aspects of the present invention. Further, other instructions may be used without departing from a spirit of the present invention.

Further, other types of computing environments can benefit from one or more aspects of the present invention. As an example, an environment may include an emulator (e.g., software or other emulation mechanisms), in which a particular architecture (including, for instance, instruction execution, architected functions, such as address translation, and architected registers) or a subset thereof is emulated (e.g., on a native computer system having a processor and memory). In such an environment, one or more emulation functions of the emulator can implement one or more aspects of the present invention, even though a computer executing the emulator may have a different architecture than the capabilities being emulated. As one example, in emulation mode, the specific instruction or operation being emulated is decoded, and an appropriate emulation function is built to implement the individual instruction or operation.

In an emulation environment, a host computer includes, for instance, a memory to store instructions and data; an instruction fetch unit to fetch instructions from memory and to optionally, provide local buffering for the fetched instruction; an instruction decode unit to receive the fetched instructions and to determine the type of instructions that have been fetched; and an instruction execution unit to execute the instructions. Execution may include loading data into a register from memory; storing data back to memory from a register; or performing some type of arithmetic or logical operation, as determined by the decode unit. In one example, each unit is implemented in software. For instance, the operations being performed by the units are implemented as one or more subroutines within emulator software.

As a further example, a data processing system suitable for storing and/or executing program code is usable that includes at least one processor coupled directly or indirectly to memory elements through a system bus. The memory elements include, for instance, local memory employed during actual execution of the program code, bulk storage, and cache memory which provide temporary storage of at least some program code in order to reduce the number of times code must be retrieved from bulk storage during execution.

Input/Output or I/O devices (including, but not limited to, keyboards, displays, pointing devices, DASD, tape, CDs, DVDs, thumb drives and other memory media, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems, and Ethernet cards are just a few of the available types of network adapters.

In one embodiment, a service, in the form of process software, for facilitating on demand security in multiple information technology environments is shared, simultaneously serving multiple customers in a flexible, automated fashion. The processes described herein can be standardized, requiring little customization and being scalable, providing capacity on demand in a pay-as-you-go model for multiple customers.

The process software can be stored on a shared file system accessible from one or more servers. The process software is executed via transactions that contain data and server processing requests that use CPU units on the accessed server. CPU units are units of time such as minutes, seconds, hours on the central processor of the server. Additionally the accessed server may make requests of other servers that require CPU units. CPU units are an example that represents but one measurement of use. Other measurements of use include but are not limited to network bandwidth, memory usage, storage usage, packet transfers, complete transactions etc.

When multiple customers use the same process software application, their transactions are differentiated by the parameters included in the transactions that identify the unique customer and the type of service for that customer. All of the CPU units and other measurements of use that are used for the services for each customer are recorded. When the number of transactions to any one server reaches a number that begins to affect the performance of that server, other servers are accessed to increase the capacity and to share the workload. Likewise when other measurements of use such as network bandwidth, memory usage, storage usage, etc. approach a capacity so as to affect performance, additional network bandwidth, memory usage, storage etc. are added to share the workload.

The measurements of use used for each service and customer are sent to a collecting server that sums the measurements of use for each customer for each service that was processed anywhere in the network of servers that provide the shared execution of the process software. The summed measurements of use units are periodically multiplied by unit costs and the resulting total process software application service costs are alternatively sent to the customer and or indicated on a web site accessed by the customer which then remits payment to the service provider.

In another embodiment, the service provider requests payment directly from a customer account at a banking or financial institution.

In another embodiment, if the service provider is also a customer of the customer that uses the process software application, the payment owed to the service provider is reconciled to the payment owed by the service provider to minimize the transfer of payments.

In accordance with aspects of the present invention, an On Demand environment can be provided which provides one or more aspects of the present invention to the multiple customers for a fee. The On Demand environment can be accessible to the customers to, e.g., initiate processing described above to facilitate security in a customer's information technology environment. Similarly, the On Demand environment can access the information technology environments of the customers to provide one or more aspects of the present invention. As an example, a customer may request, by way of the On Demand environment, that the information technology environment of the customer be assessed and/or patched by the On Demand environment to facilitate security of the customer's information technology environment. As a more specific example, the On Demand environment may perform one or more functions of a security operations center, described above, and can deploy one or more virtual patches to one or more components of the customer's information technology environment to facilitate security therein.

Figure 8:
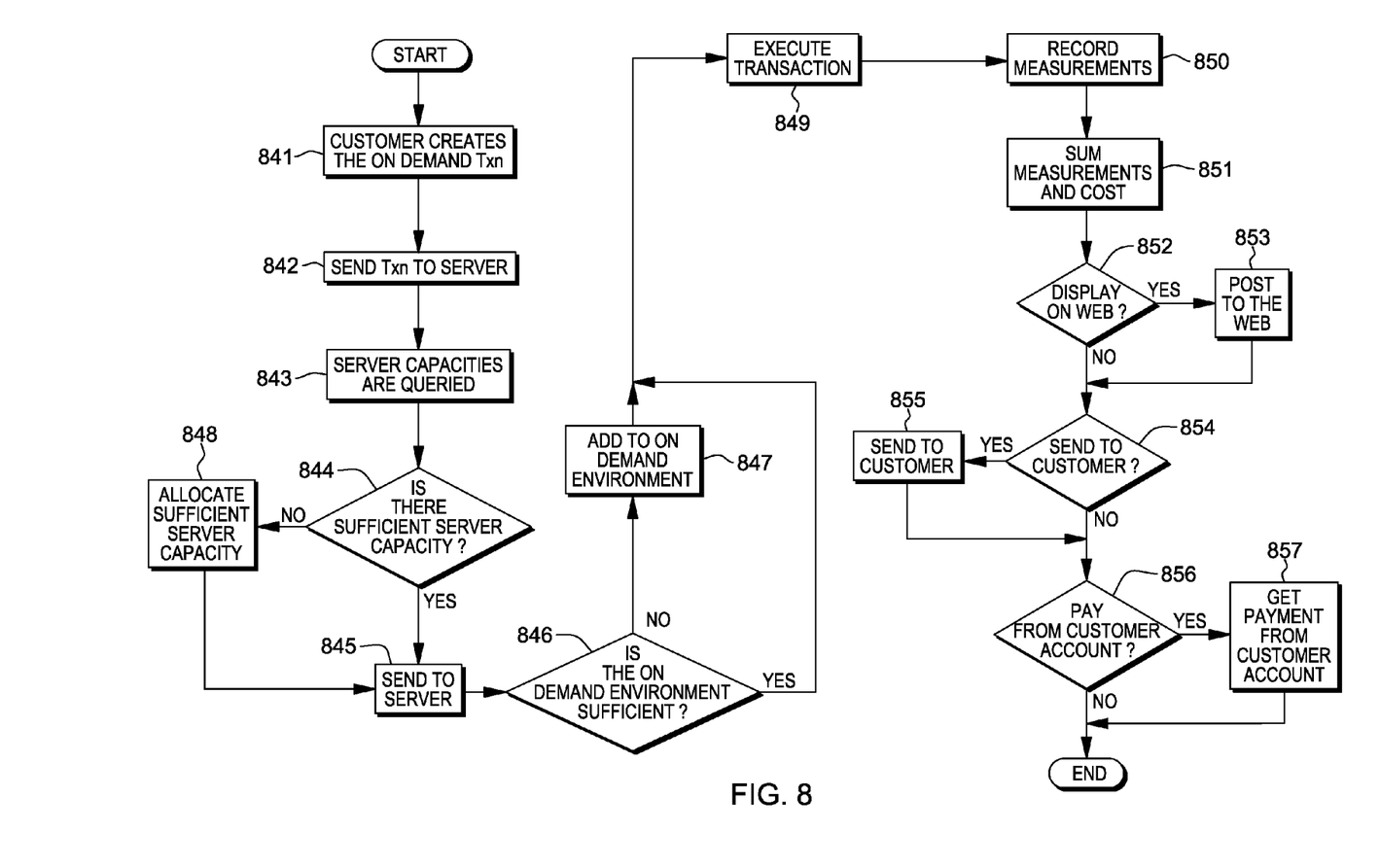
FIG. 8 depicts an example of a process for providing on-demand services for a customer, in accordance with one or more aspects of the present invention.

Referring to FIG. 8, which depicts an On Demand process, a transaction is created than contains the unique customer identification, the requested service type and any service parameters that further specify the type of service (841). The transaction is then sent to the main server (842). In an On Demand environment the main server can initially be the only server, and then as capacity is consumed, other servers are added to the On Demand environment.

The server central processing unit (CPU) capacities in the On Demand environment are queried (843). The CPU requirement of the transaction is estimated, then the server's available CPU capacity in the On Demand environment is compared to the transaction CPU requirement to see if there is sufficient CPU available capacity in any server to process the transaction (844). If there is not sufficient server CPU available capacity, then additional server CPU capacity is allocated to process the transaction (848). If there was already sufficient Available CPU capacity then the transaction is sent to a selected server (845).

Before executing the transaction, a check is made of the remaining On Demand environment to determine if the environment has sufficient available capacity for processing the transaction (846). This environment capacity consists of such things as, but not limited to, network bandwidth, processor memory, storage etc. If there is not sufficient available capacity, then capacity will be added to the On Demand environment 247. Next, the required software to process the transaction is accessed, loaded into memory, and then the transaction is executed (849). In the context of the present invention, the transaction could include all or some of the processing described above for facilitating security in the information technology environment of the customer.

The usage measurements are recorded (850). The usage measurements consist of the portions of those functions in the On Demand environment that are used to process the transaction. The usage of such functions as, but not limited to, network bandwidth, processor memory, storage and CPU cycles are what is recorded. The usage measurements are summed, multiplied by unit costs and then recorded as a charge to the requesting customer (851).

If the customer has requested that the On Demand costs be posted to a web site (852), then they are posted (853). If the customer has requested that the On Demand costs be sent via e-mail to a customer address (854), then they are sent (855). If the customer has requested that the On Demand costs be paid directly from a customer account (856), then payment is received directly from the customer account (857).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprise" (and any form of comprise, such as "comprises" and "comprising"), "have" (and any form of have, such as "has" and "having"), "include" (and any form of include, such as "includes" and "including"), and "contain" (and any form contain, such as "contains" and "containing") are open-ended linking verbs. As a result, a method or device that "comprises", "has", "includes" or "contains" one or more steps or elements possesses those one or more steps or elements, but is not limited to possessing only those one or more steps or elements. Likewise, a step of a method or an element of a device that "comprises", "has", "includes" or "contains" one or more features possesses those one or more features, but is not limited to possessing only those one or more features. Furthermore, a device or structure that is configured in a certain way is configured in at least that way, but may also be configured in ways that are not listed.

The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiment with various modifications as are suited to the particular use contemplated.

What is claimed is:

1. A method for facilitating security in an information technology environment, the method comprising:
    inspecting, by a processor, behavior of a web application during execution thereof in the information technology environment, the inspecting determining whether a security vulnerability associated with execution of the web application in the information technology environment exists based on comparing baseline behavior of the web application to behavior of the web application observed in response to executing modified versions of requests issued to the web application to generate the baseline behavior; and
    responsive to determining that the security vulnerability exists, generating at least one virtual patch, the at least one virtual patch comprising one or more logical pattern expressions representative of the security vulnerability determined based on the behavior of the web application during execution thereof, and the at least one virtual patch for patching one or more infrastructure components of the information technology environment to prevent exploitation of the security vulnerability in the information technology environment.

2. The method of claim 1, further comprising establishing the baseline behavior for the web application, the establishing the baseline behavior comprising issuing at least one baseline request of the requests to the web application for execution of the at least one baseline request, and, for each baseline request of the at least one baseline request, associating a respective baseline response of the web application, obtained responsive to execution of the baseline request, with the issued baseline request to form at least one baseline request/response pair.

3. The method of claim 2, wherein inspecting the behavior of the web application comprises:
    determining at least one variant request, the at least one variant request based on the at least one baseline request and comprising one or more modifications to at least one request element of the at least one baseline request;
    issuing the at least one variant request to the web application for execution thereof;
    for each variant request of the at least one variant request, associating a respective variant response of the web application, obtained responsive to execution of the variant request, with the variant request to form a variant request/response pair; and
    identifying at least one variant request/response pair that indicates existence of the security vulnerability, the identifying the at least one variant request/response pair comprising comparing the variant response of the variant request/response pair with the at least one baseline response and determining, based on the comparing, whether a difference between the at least one baseline response and the variant response indicates existence of the security vulnerability.

4. The method of claim 3, further comprising, responsive to determining that a security vulnerability exists, determining a request type from which the security vulnerability originated, the request type being an external system request type or an internal system request type, and repeating the inspecting of the web application to determine whether the security vulnerability persists, wherein repeating the inspecting comprises tailoring variant requests for issuing to the web application according to the determined request type from which the security vulnerability originated, and wherein generating the at least one virtual patch is performed responsive to the repeating the inspecting indicating that security vulnerability persists.

5. The method of claim 4, further comprising repeating the inspecting and the generating responsive to one or more other security vulnerabilities existing, to patch the one or more infrastructure components of the information technology environment to prevent exploitation of the one or more other security vulnerabilities in the information technology environment.

6. The method of claim 3, wherein the one or more modifications to the at least one request element are stored as security scan metadata, and wherein generating the at least one virtual patch comprises:
    collecting the identified at least one variant request/response pair and the scan metadata;
    determining one or more permutations of the at least one variant request/response pair, the computing identifying request elements of the at least one variant request that attempt to exploit the security vulnerability; and
    correlating the one or more permutations to obtain the logical pattern expressions for providing to the one or more infrastructure components of the information technology environment to facilitating patching thereof.

7. The method of claim 6, wherein the one or more logical expressions encompasses permutations of a variant request/response pair indicative of the security vulnerability.

8. The method of claim 6, wherein the method further comprises confirming that the at least one virtual patch was applied to prevent exploitation of the security vulnerability in the information technology environment, the confirming comprising:
    reinitiating inspection of the behavior of the web application, wherein a variant request to exploit the security vulnerability is issued to the web application; and
    confirming that the variant request is blocked from exploiting the security vulnerability.

9. The method of claim 1, further comprising logging the security vulnerability as a security event.

10. The method of claim 1, wherein the generating the at least one virtual patch is performed responsive to determining that the one or more infrastructure components of the information technology environment are not already preventing exploitation of the security vulnerability in the information technology environment.

11. The method of claim 1, wherein the one or more infrastructure components of the information technology environment comprise an intrusion protection system, wherein the at least one virtual patch comprises an identification for the intrusion protection system of an exploit scenario for exploiting the security vulnerability, and wherein the method further comprises providing the identification to the intrusion protection system for patching thereof, wherein patching thereof prevents exploitation of the security vulnerability in the information technology environment.

12. The method of claim 1, wherein the method further comprises, responsive to determining that the security vulnerability exists:
    checking a network history archive to determine whether the security vulnerability has already been subject to an unsuspected exploit thereof; and
    initiating a forensic investigation, responsive to determining that the security vulnerability was subject to an unsuspected exploit thereof.

13. The method of claim 1, wherein the web application comprises a customized web application for the information technology environment, and wherein the security vulnerability comprises a security vulnerability specific to execution of the customized web application in the information technology environment.

14. A computer system for facilitating security in an information technology environment, the computer system comprising:
   a memory; and
   a processor, in communications with the memory, wherein the computer system is configured to perform:
   inspecting behavior of a web application during execution thereof in the information technology environment, the inspecting, determining whether a security vulnerability associated with execution of the web application in the information technology environment exists based on comparing baseline behavior of the web application to behavior of the web application observed in response to executing modified versions of requests to the web application to generate the baseline behavior; and
   responsive to determining that the security vulnerability exists, generating at least one virtual patch, the at least one virtual patch comprising one or more logical pattern expressions representative of the security vulnerability determined based on the behavior of the web application during execution thereof, and the at least one virtual patch for patching one or more infrastructure components of the information technology environment to prevent exploitation of the security vulnerability in the information technology environment.

15. The computer system of claim 14, wherein the computer system is further configured to perform: establishing the baseline behavior for the web application, the establishing the baseline behavior comprising issuing at least one baseline request of the requests to the web application for execution of the at least one baseline request, and, for each baseline request of the at least one baseline request, associating a respective baseline response of the web application, obtained responsive to execution of the baseline request, with the issued baseline request to form at least one baseline request/response pair.

16. The computer system of claim 15, wherein inspecting the behavior of the web application comprises:
   determining at least one variant request, the at least one variant request based on the at least one baseline request and comprising one or more modifications to at least one request element of the at least one baseline request;
   issuing the at least one variant request to the web application for execution thereof;
   for each variant request of the at least one variant request, associating a respective variant response of the web application, obtained responsive to execution of the variant request, with the variant request to form a variant request/response pair; and
   identifying at least one variant request/response pair that indicates existence of the security vulnerability, the identifying the at least one variant request/response pair comprising comparing the variant response of the variant request/response pair with the at least one baseline response and determining, based on the comparing, whether a difference between the at least one baseline response and the variant response indicates existence of the security vulnerability.

17. The computer system of claim 16, wherein the computer system is further configured to perform:
   responsive to determining that a security vulnerability exists, determining a request type from which the security vulnerability originated, the request type being an external system request type or an internal system request type, and repeating the inspecting of the web application to determine whether the security vulnerability persists, wherein repeating the inspecting comprises tailoring variant requests for issuing to the web application according to the determined request type from which the security vulnerability originated, and wherein generating the at least one virtual patch is performed responsive to the repeating the inspecting indicating that security vulnerability persists; and
   repeating the inspecting and the generating responsive to one or more other security vulnerabilities existing, to patch the one or more infrastructure components of the information technology environment to prevent exploitation of the one or more other security vulnerabilities in the information technology environment.

18. The computer system of claim 16, wherein the one or more modifications to the at least one request element are stored as security scan metadata, and wherein generating the at least one virtual patch comprises:
   collecting the identified at least one variant request/response pair and the scan metadata;
   determining one or more permutations of the at least one variant request/response pair, the computing identifying request elements of the at least one variant request that attempt to exploit the security vulnerability; and
   correlating the one or more permutations to obtain the logical pattern expressions for providing to the one or more infrastructure components of the information technology environment to facilitating patching thereof.

19. The computer system of claim 14, wherein the one or more infrastructure components of the information technology environment comprise an intrusion protection system, wherein the at least one virtual patch comprises an identification for the intrusion protection system of an exploit scenario for exploiting the security vulnerability, and wherein the method further comprises providing the identification to the intrusion protection system for patching thereof, wherein patching thereof prevents exploitation of the security vulnerability in the information technology environment.

20. The computer system of claim 14, wherein the web application comprises a customized web application for the information technology environment, and wherein the security vulnerability comprises a security vulnerability specific to execution of the customized web application in the information technology environment.

21. A computer program product for facilitating security in an information technology environment, the computer program product comprising:
   computer readable program code configured to inspect behavior of a web application during execution thereof in the information technology environment, the inspecting whether a security vulnerability associated with execution of the web application in the information technology environment exists based on comparing baseline behavior of the web application to behavior of the web application observed in response to executing modified versions of requests issues to the web application to generate the baseline behavior; and
   computer readable program code configured to, responsive to determining that the security vulnerability exists, generate at least one virtual patch, the at least one virtual patch comprising one or more logical pattern expressions representative of the security vulnerability determined based on the behavior of the web application during execution thereof, and the at least one virtual patch for patching one or more infrastructure components of the information technology environment to prevent exploitation of the security vulnerability in the information technology environment.

22. The computer program product of claim 21, further comprising computer readable program code to establish the baseline behavior for the web application, the establishing the baseline behavior comprising issuing at least one baseline request of the requests to the web application for execution of the at least one baseline request, and, for each baseline request of the at least one baseline request, associate a respective baseline response of the web application, obtained responsive to execution of the baseline request, with the issued baseline request to form at least one baseline request/response pair.

23. The computer program product of claim 21, wherein the computer readable program code configured to inspect the behavior of the web application comprises:
   computer readable program code configured to determine at least one variant request, the at least one variant request based on the at least one baseline request and comprising one or more modifications to at least one request element of the at least one baseline request;
   computer readable program code configured to issue the at least one variant request to the web application for execution thereof;
   computer readable program code configured to, for each variant request of the at least one variant request, associate a respective variant response of the web application, obtained responsive to execution of the variant request, with the variant request to form a variant request/response pair; and
   computer readable program code configured to identify at least one variant request/response pair that indicates existence of the security vulnerability, the identifying the at least one variant request/response pair comprising comparing the variant response of the variant request/response pair with the at least one baseline response and determining, based on the comparing, whether a difference between the at least one baseline response and the variant response indicates existence of the security vulnerability.

24. The computer program product of claim 21, wherein the web application comprises a customized web application for the information technology environment, and wherein the security vulnerability comprises a security vulnerability specific to execution of the customized web application in the information technology environment.

25. A method for facilitating on demand security in an information technology environment of a customer, the method comprising:
   responsive to a customer request, inspecting behavior of a web application during execution thereof in the information technology environment of the customer, the inspecting determining whether a security vulnerability associated with execution of the web application in the information technology environment of the customer exists based on comparing baseline behavior of the web application to behavior of the web application observed in response to executing modified versions of requests issued to the web application to generate the baseline behavior; and
   responsive to determining that the security vulnerability exists, generating at least one virtual patch, the at least one virtual patch comprising one or more logical pattern expressions representative of the security vulnerability determined based on the behavior of the web application during execution thereof, and the at least one virtual patch to be provided to the customer for patching one or more infrastructure components of the information technology environment of the customer to prevent exploitation of the security vulnerability in the information technology environment of the customer.

* * * * *